United States Patent
Abramovich et al.

(10) Patent No.: US 8,600,123 B2
(45) Date of Patent: Dec. 3, 2013

(54) SYSTEM AND METHOD FOR CONTACTLESS MULTI-FINGERPRINT COLLECTION

(75) Inventors: Gil Abramovich, Niskayuna, NY (US); Kevin George Harding, Niskayuna, NY (US); Christopher Allen Nafis, Rexford, NY (US); Joseph Czechowski, III, Clifton Park, NY (US); Vijay Krishna Paruchuru, Latham, NY (US); Daniel Curtis Gray, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 279 days.

(21) Appl. No.: 12/889,663

(22) Filed: Sep. 24, 2010

(65) Prior Publication Data

US 2012/0076369 A1   Mar. 29, 2012

(51) Int. Cl.
*G06K 9/00* (2006.01)
(52) U.S. Cl.
USPC .......................................... 382/124; 382/126
(58) Field of Classification Search
USPC ................................................ 382/124, 126
See application file for complete search history.

(56) References Cited

U.S. PATENT DOCUMENTS

| | | | |
|---|---|---|---|
| 3,619,065 A * | 11/1971 | Agnew .......................... | 356/604 |
| 5,485,236 A * | 1/1996 | Arai et al. ...................... | 396/65 |
| 6,483,932 B1 | 11/2002 | Martinez et al. | |
| 6,970,584 B2 * | 11/2005 | O'Gorman et al. ............ | 382/126 |
| 7,343,026 B2 * | 3/2008 | Niwa et al. ..................... | 382/103 |
| 7,428,997 B2 * | 9/2008 | Wiklof et al. ............. | 235/462.42 |
| 7,474,773 B2 * | 1/2009 | Chau .............................. | 382/124 |
| 2002/0131624 A1 | 9/2002 | Shapiro et al. | |
| 2004/0120556 A1 * | 6/2004 | Kono et al. .................... | 382/124 |

(Continued)

FOREIGN PATENT DOCUMENTS

| | | |
|---|---|---|
| EP | 1805690 B1 | 4/2008 |
| JP | 2001167255 A | 6/2001 |
| JP | 2008048903 A | 3/2008 |
| WO | 2008078895 A1 | 7/2008 |

OTHER PUBLICATIONS

"3-D light system revolutionizes way fingerprints are taken," Layer 8, Mar. 12, 2009, http://www.networkworld.com/community/node/39654, pp. 1-4.

Chen et al., "3D Touchless Fingerprints: Compatibility With Legacy Rolled Images," Abstract, TBS Holding AG, Schindellegistrasse 19CH-8808, Pfaeffikon, Switzerland, pp, 1-6, (year: 2006).

(Continued)

*Primary Examiner* — Bernard Krasnic
*Assistant Examiner* — Weiwen Yang
(74) *Attorney, Agent, or Firm* — Ziolkowski Patent Solutions Group, SC; Jean K. Testa

(57) ABSTRACT

A system and method for contactless multi-fingerprint collection is disclosed. The contactless multi-fingerprint collection system includes an imaging volume, a user interface configured to provide feedback to the subject regarding a proximity of a hand to a desired imaging location within the imaging volume, and at least one image capture device to capture images of each of the plurality of fingerprints at each of at least two different depths from the fingerprints. The contactless multi-fingerprint collection system also includes a processor coupled to the at least one image capture device that is programmed to generate a composite image and a contour map of each of the plurality of fingerprints from the images captured at the at least two different depths and generate a two-dimensional rolled equivalent image of each of the plurality of fingerprints from the composite image and the contour map.

26 Claims, 14 Drawing Sheets

(56) References Cited

U.S. PATENT DOCUMENTS

| | | | |
|---|---|---|---|
| 2005/0265586 A1 | 12/2005 | Rowe et al. | |
| 2006/0202028 A1* | 9/2006 | Rowe et al. | 235/382 |
| 2006/0239518 A1* | 10/2006 | Scott | 382/124 |
| 2007/0085972 A1* | 4/2007 | Tan et al. | 353/20 |
| 2008/0007507 A1 | 1/2008 | Kim et al. | |
| 2008/0049987 A1* | 2/2008 | Champagne et al. | 382/124 |
| 2008/0101664 A1 | 5/2008 | Perez | |
| 2009/0080709 A1* | 3/2009 | Rowe et al. | 382/115 |
| 2009/0226054 A1* | 9/2009 | Jelinek | 382/126 |
| 2010/0119124 A1* | 5/2010 | Satyan | 382/124 |

OTHER PUBLICATIONS

"Biometric Detector HITS," S&T Stakeholders Conference, May 21-24, 2007, pp. 1-13.

Kirby et al., "Adaptive Lenses Based on Polarization Modulation," Abstract, Proceedings of SPIE, the International Society for Optical Engineering, Adaptive Optics for Industry and Medicine, International Workshop on Adaptive Optics for Industry and Medicine, Beijing, China, 2005, pp. 1-5.

Favaro et al., "Learning Shape from Defocus," Lecture Notes in Computer Science, vol. 2351, Proceedings of the 7th European Conference on Computer Vision—Part II, Year of Publication: 2002, pp. 735-745.

* cited by examiner

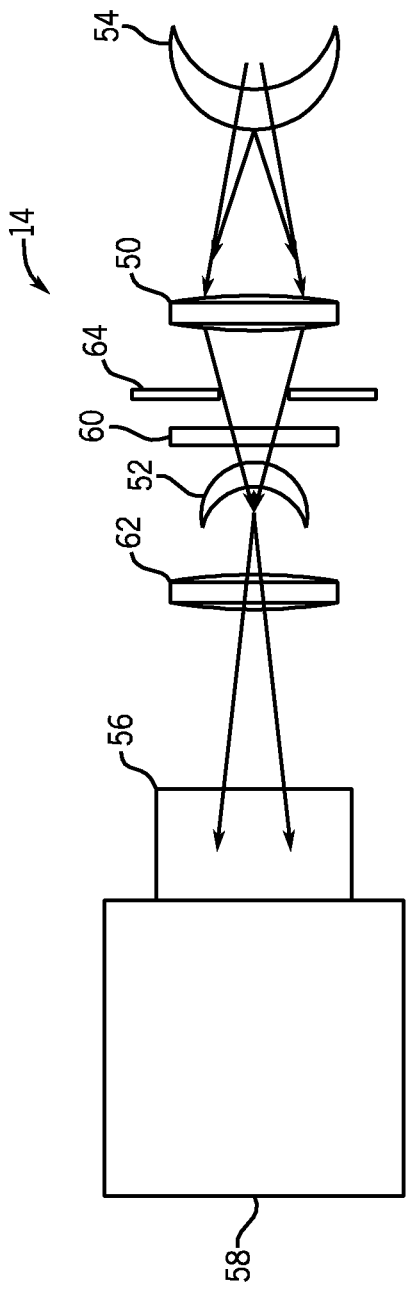
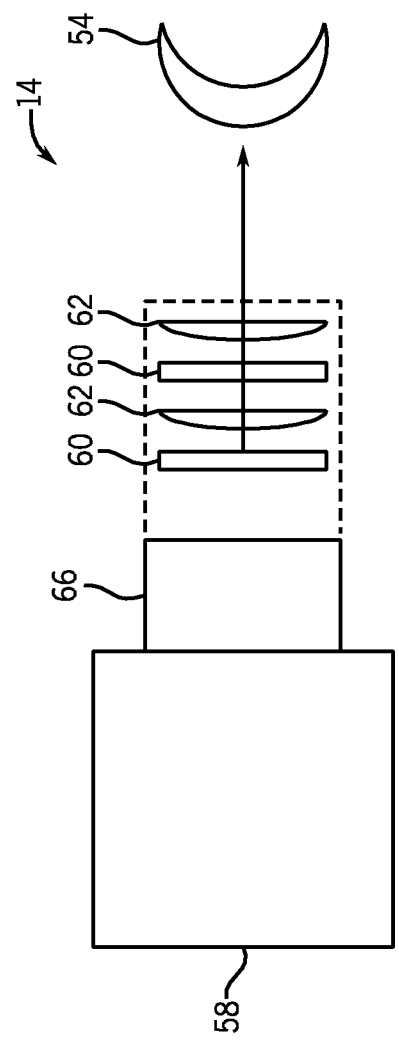

SYSTEM AND METHOD FOR CONTACTLESS MULTI-FINGERPRINT COLLECTION

GOVERNMENT LICENSE RIGHTS

This invention was made with Government support under grant number HSHQDC-08-C-00042 awarded by the Department of Homeland Security. The Government has certain rights in the invention.

BACKGROUND OF THE INVENTION

Embodiments of the invention relate generally to a system and method for fingerprint collection, and more particularly to a contactless multi-fingerprint collection device.

It is well known that the patterns and geometry of fingerprints are different for each individual and are unchanged over time. Thus fingerprints serve as extremely accurate identifiers of an individual since they rely on un-modifiable physical attributes. The classification of fingerprints is usually based on certain characteristics such as arch, loop or whorl, with the most distinctive characteristics being the minutiae, the forks, or endings found in the ridges and the overall shape of the ridge flow.

Traditionally, fingerprints have been obtained by means of ink and paper, where a subject covers a surface of their finger with ink and presses/rolls their finger onto paper or a similar surface to produce a rolled fingerprint. More recently, various electronic fingerprint scanning systems have been developed that obtain images of fingerprints utilizing an optical fingerprint image capture technique. Such electronic fingerprint scanning systems have typically been in the form of contact based fingerprint readers that require a subject's finger to be put in contact with a screen and then physically rolled across the screen to provide an optically acquired full rolled-image fingerprint. However, such contact based fingerprint readers have significant drawbacks associated therewith. For example, in a field environment, dirt, grease or other debris may build up on the window of contact based fingerprint readers, so as to generate poor quality fingerprint images. Additionally, such contact based fingerprint readers provide a means of spreading disease or other contamination from one person to another.

In a most recent generation of electronic fingerprint scanning systems, contactless fingerprint readers have been proposed where fingerprints are captured without the need for physical contact between a subject's finger and a screen. However, existing contactless fingerprint scanning systems are limited regarding the type of fingerprint images they can acquire. For example, one existing type of contactless fingerprint scanning system is capable of acquiring a single flat image of the finger by utilizing a structured light source. Such single flat images, however, do not provide the entire fingerprint data, as the use of structured light does not allow for capture of a large area of the fingerprint (i.e., the overlap between a camera field of view and that of the structured light is small). Additionally, the technique employed to create contrast between fingerprint ridges and valleys of the single flat image uses a shallow depth-of-field that prevents all areas of the finger, such as the top and sides of the finger, from being in clear focus in the same image.

Another existing type of contactless fingerprint scanning system acquires full 3D images of the fingers using a method such as structured light. However, as set forth above, the use of structured light does not allow for capture of a large area of the fingerprint based on a small overlap between a camera field of view and that of the structured light. Additionally, such 3D fingerprint readers create extra information about the shape of the finger that is not currently used in databases and, as such, the data is not compatible with the vast sets of fingerprint data already on file today.

Therefore, it would be desirable to design a system and method of acquiring a full contactless fingerprint capture that excludes any contact between the hand and the fingerprint reader and that provides full rolled equivalent fingerprint images. Furthermore, it would be desirable to simultaneously capture multiple fingerprints from a subject and provide usability to the general population to adapt to different finger and hand shapes and diversities in the subject's hand eye coordination.

BRIEF DESCRIPTION OF THE INVENTION

Embodiments of the invention are directed to a system and method for contactless multi-fingerprint collection.

According to one aspect of the invention, a contactless multi-fingerprint collection device for imaging a plurality of fingerprints includes an imaging volume configured to receive a hand of a subject for imaging the plurality of fingerprints, a user interface configured to provide feedback to the subject regarding a proximity of the hand to a desired imaging location within the imaging volume, and at least one image capture device to capture images of each of the plurality of fingerprints at each of at least two different depths from the fingerprints when the hand is at the desired imaging location. The contactless multi-fingerprint collection device also includes a processor coupled to the at least one image capture device that is programmed to generate a composite image and a contour map of each of the plurality of fingerprints from the images captured at the at least two different depths and generate a two-dimensional rolled equivalent image of each of the plurality of fingerprints from the composite image and the contour map.

According to another aspect of the invention, a method for collecting images of multiple fingerprints of a subject in a contactless manner includes receiving a hand and fingers of a subject within an imaging volume of a contactless multi-fingerprint collection device and determining when the fingers of the subject are within a field-of-view of an image capture system of the contactless multi-fingerprint collection device within the imaging volume. The method also includes capturing fingerprint images of each of the fingers at each of at least two different depths from the fingerprints by way of the image capture system upon a determination that the fingers are within the field-of-view, registering and combining the fingerprint images captured at the at least two different depths to form a composite image of each of the plurality of fingerprints, calculating a depth map of the composite image for each of the plurality of fingerprints using one of a depth from focus and a depth from defocus algorithm, and generating a two-dimensional rolled equivalent image of each of the plurality of fingerprints from the composite image and the depth map.

According to yet another aspect of the invention, a contactless multi-fingerprint collection device for imaging a plurality of fingerprints includes an imaging volume configured to receive a hand of a subject for imaging the plurality of fingerprints, at least one positioning verification device configured to determine a proximity of the fingers of the subject to desired imaging locations within the imaging volume, a positioning assistance device configured to provide feedback to the subject to aid in guiding fingers to the desired imaging locations within the imaging volume, and at least one image capture device configured to capture images of each of the plurality of fingerprints at each of a plurality of focus depths from the fingerprints, with the at least one image capture device being automatically triggered upon placement of the fingers at the desired imaging locations. The contactless multi-fingerprint collection device also includes a processor coupled to the at least one image capture device that is programmed to register and combine the fingerprint images captured at the plurality of focus depths to form a composite image of each of the plurality of fingerprints, calculate a depth map of the composite image for each of the plurality of fingerprints using one of a depth from focus and a depth from defocus algorithm, and generate a two-dimensional rolled equivalent image of each of the plurality of fingerprints from the composite image and the contour map.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 4 is an illustration of an imaging system, using a birefringent lens as a magnifying lens, forming an intermediate image that is usable with the contactless multi-fingerprint collection device of FIG. 1 according to an embodiment of the invention.

FIG. 5 is an illustration of a birefringent element and LCP placed in front of a single imaging lens that is usable with the contactless multi-fingerprint collection device of FIG. 1 according to an embodiment of the invention.

DETAILED DESCRIPTION

The operating environment of embodiments of the invention is described below with respect to a system and method for contactless multi-fingerprint collection. The contactless multi-fingerprint collection device provides multiple rolled equivalent fingerprint images. For each finger being examined, the system collects images taken at different depths or distances to the finger (e.g., 4 depths) that are then interpreted into an image with all depths in focus. A three-dimensional (3D) model of the finger is constructed and it is unrolled to the equivalent of a flat image obtained from rolling the finger.

Figure 1:
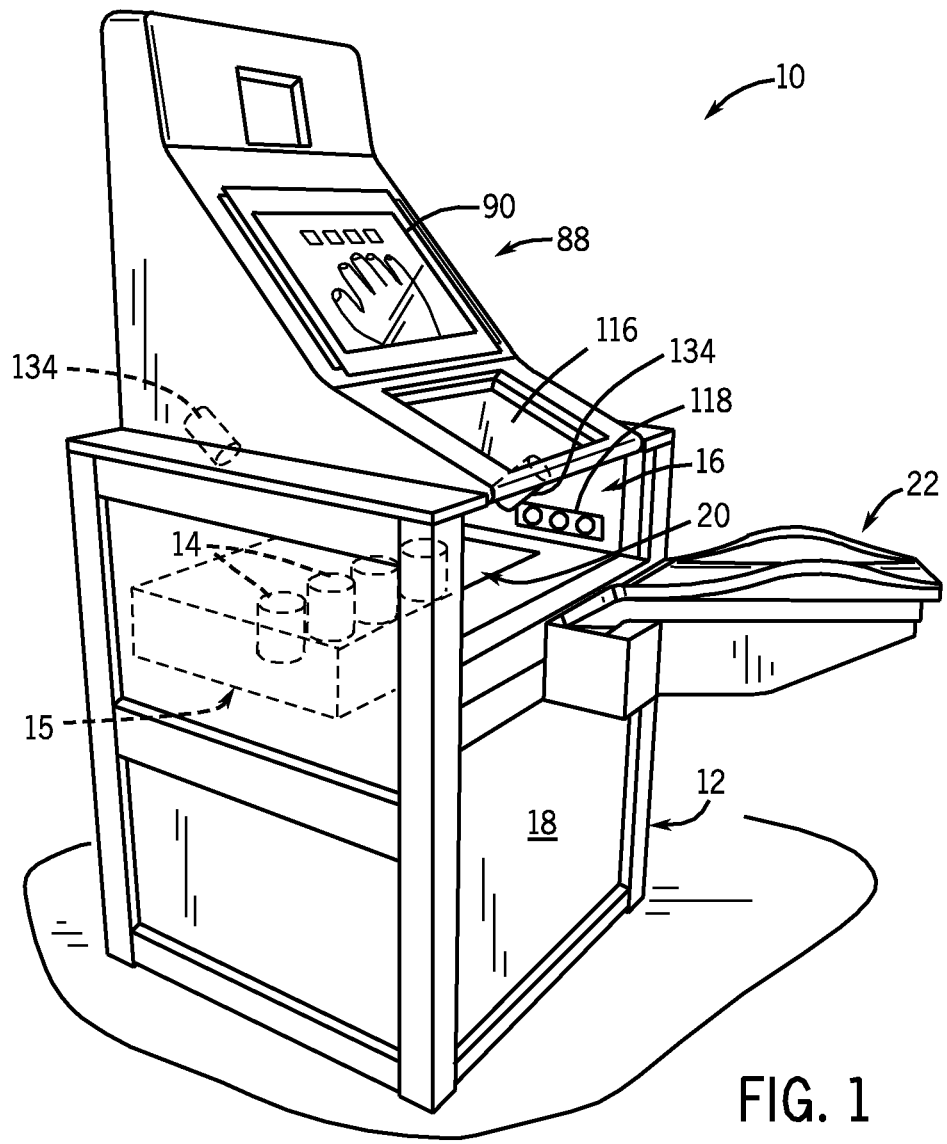
FIG. 1 is a perspective view of a contactless multi-fingerprint collection device according to an embodiment of the invention.

Referring to FIG. 1, a contactless multi-fingerprint collection device 10 is shown according to an embodiment of the invention. The device 10 includes an outer housing 12 that encloses one or more image capture devices 14 (i.e., imaging devices) that collectively form an image capture system 15 and that are configured to acquire multiple fingerprints from a subject in a contactless manner, as will be described in greater detail below. The housing 12 of contactless multi-fingerprint collection device 10 includes 16 an opening formed in a front panel 18 thereof that provides access to an imaging volume 20 that is substantially enclosed by the housing 12. In operation of device 10, the subject inserts a hand through opening 16 and into imaging volume 20. Once the hand is inserted into the imaging volume 20, the image capture system 15 collects images of the subject's hand such that multiple fingerprints are acquired in a contactless manner. It is recognized that the image capture system 15 may perform the acquisition of the multiple fingerprints according to one of several techniques, according to embodiments of the invention. In general, the techniques can be categorized by the subject either holding their hand in a stationary position within imaging volume 20 to provide for multi-fingerprint acquisition or by the subject swiping or waving their hand within the imaging volume 20 in a generally horizontal to provide for multi-fingerprint acquisition. When the subject holds their hand in a stationary position, multiple image capture devices 14 may be employed to simultaneously capture the multiple fingerprints. When the subject swipes/waves their hand within the imaging volume 20, a single image capture device 14 may be employed to capture the multiple fingerprints in rapid succession.

According to an embodiment of the invention where the subject holds their hand in a stationary position within imaging volume 20 to provide for multi-fingerprint acquisition, an optional armrest extends 22 outward from the front panel 18 of housing 12 adjacent to opening 16 so as to accommodate positioning of the arm of a subject therein, as shown in FIG. 1. The armrest 22 is in the form of a flexible armrest that provides for accommodation of either a right or left hand of a subject. Additionally, the armrest 22 may be height adjustable in order to accommodate subjects of varying height. In operation, the subject places their forearm in armrest 22 and subsequently inserts a hand through opening 16 and into imaging volume 20. Once the hand is properly positioned in the imaging volume 20, the one or more image capture devices 14 collect images of the subject's hand such that multiple fingerprints are simultaneously acquired in a contactless manner.

According to one embodiment of the invention where the subject holds their hand in a stationary position within imaging volume 20 to provide for multi-fingerprint acquisition, a dedicated image capture device 14 is provided for each finger of the subject to acquire stationary images of the fingers of the subject. Each image capture device 14 employs a camera and electro-optics in the form of one or more liquid crystal panels (LCPs), and one or more birefringent optical elements (i.e., an element whose optical path length is dependent upon the orientation of the polarization of the light, such as a birefringent window or birefringent lens) to collect images taken at different depths or distances to the finger that are then interpreted into an image with all depths in focus. Additionally each image capture device 14 may comprise additional components, such as additional lens, mirrors, light filters, apertures, illuminating devices, and electronic components.

Various embodiments of an image capture device 14 and/or of the electro-optics included therein, are illustrated in FIGS. 2-7, with each of the embodiments including LCPs and birefringent optical elements that are positioned between the camera and the subject's finger to change the optical path length of the imaging system. This results in two or more optical paths of different lengths, which causes a refocus of the resulting fingerprint image. The change in optical path length by the LCP and birefringent optical element has the same effect on the focus/defocus of the image, as would a change in the physical distance between the finger and the imaging system. Data from the fingerprint images from the focused and refocused optical path lengths are used to generate a composite high resolution image of the general shape of the finger and to generate a finger contour or depth map. This may be referred to as a depth from focus (DFF) or a depth from defocus (DFD) calculation. The contour/depth map may then be used to transform the composite high resolution finger print image into a two dimensional rolled-out version of the 3D fingerprint.

In operation, a supplied electronic signal (i.e., voltage) is used to control the polarization rotation caused by the LCP. One or more different voltages are applied to the LCP so as to cause the polarization rotation to change. Subsequently this causes the light to see a different index of refraction path within the birefringent element, resulting in a different optical path length. Any variation in the optical path length results in changes in the focus/defocus on the images acquired by the camera similar to a physical change in the distance between the finger and the camera.

In certain embodiments, two or more focal shifts on the order of between about 2 and about 10 millimeters are used. If the depth-of-field (DOF) of the finger is larger than the focal shift, the images created will have an overlapping focus with the central 'best focus' regions to either side of the overlap area. Depth-of-Field (DOF) is defined as the imaging region through which a given size feature, for example the ridges on a fingerprint, do not appear to change focus. If the DOF is shorter than the path length shift, then each image will show a band of clear focus at different depths on the fingerprint. To generate a two-dimensional fingerprint with good resolution at all locations on the finger, some overlap of the focus regions is preferred.

Figure 2:
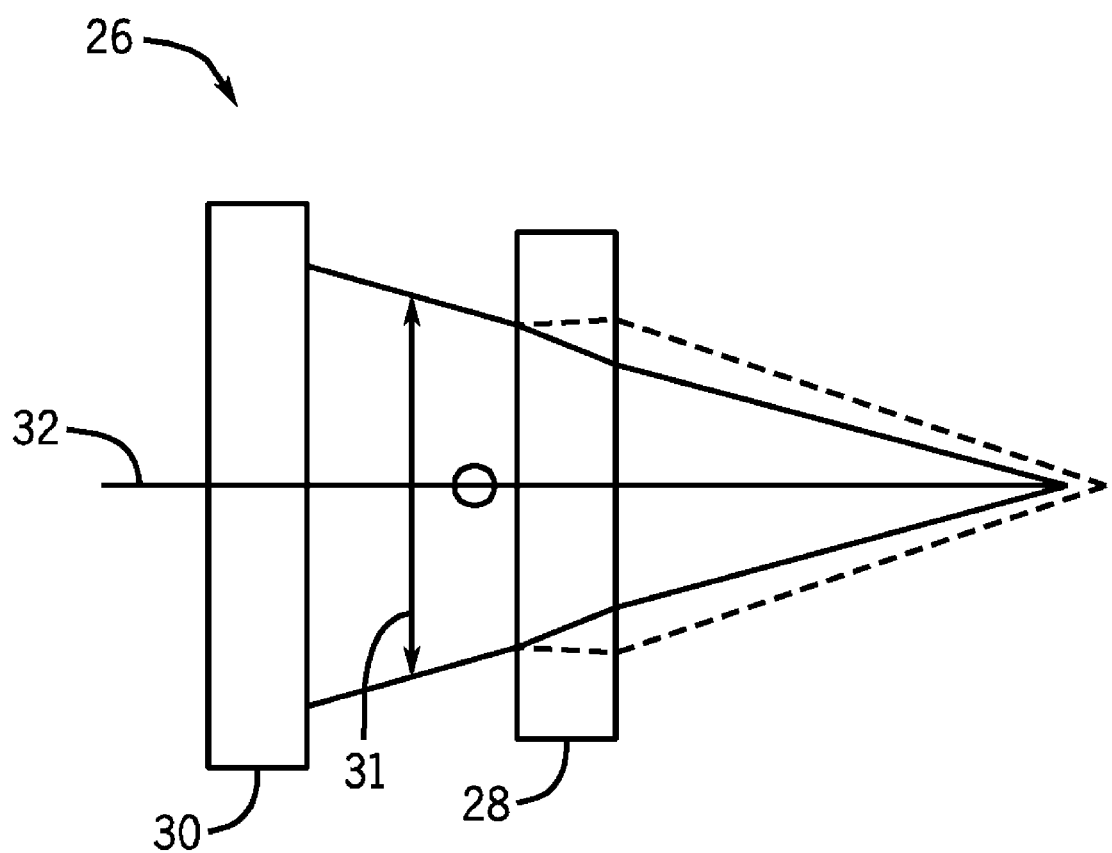
FIG. 2 is an illustration of focal shift using a birefringent window.

Referring now to FIG. 2, according to one embodiment, the electro-optics 26 of an image capture device 14 (FIG. 1) includes a birefringent window 28 and an LCP 30. The birefringent window 28 may comprise a transparent material such as, but not limited to, quartz, lithium niobate, and calcite and is cut with a fast axis 31 perpendicular to the optical axis 32 of the image capture device. When the incoming light is polarized along the fast axis the optical path is equal to L times $n_o$, and when the incoming light is perpendicular to the fast axis the optical path is equal to L times $n_e$. The term L refers to the distance between elements and the terms $n_o$ and $n_e$ refer to the refractive indices for polarizations perpendicular (ordinary) and parallel (extraordinary) to the axis of anisotropy respectively. In the case of crystal quartz, the index shift between the two orientations is around 0.018 RIU (refractive index units), such that a window, which is one centimeter thick, can provide a change in path length of 0.18 millimeters. Calcite has an index shift of about 0.16 RIU for an image shift of 1.6 millimeters for a 1-centimeter thick window. In comparison lithium niobate has an index shift of nearly 0.2 RIU, producing potential shifts of 1.9 millimeters compared to calcites' 1.6 millimeter.

Figure 3:
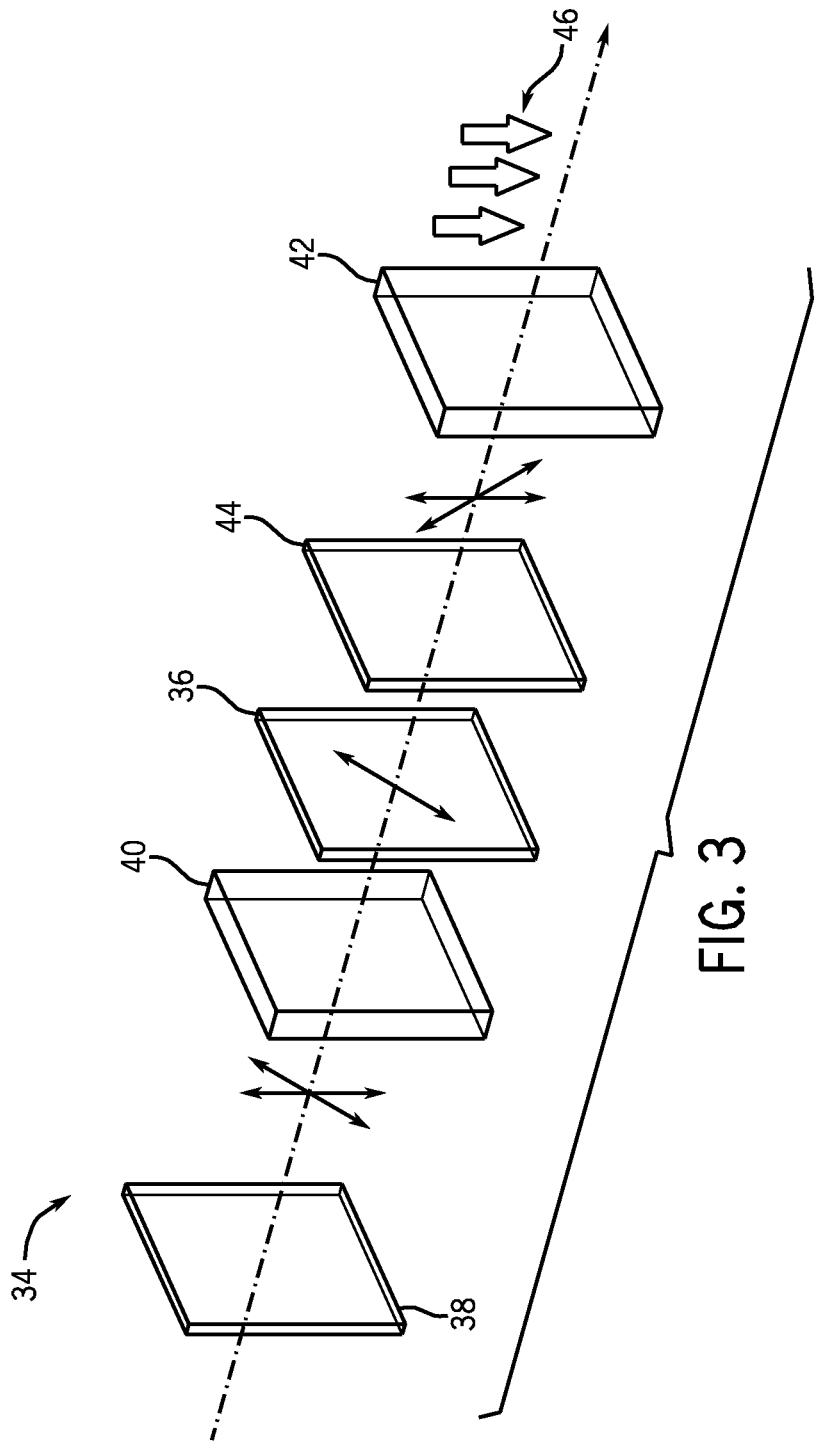
FIG. 3 is a representation of a multi-stage apparatus having tandem birefringent elements for producing 3 or 4 focal distances that is usable with the contactless multi-fingerprint collection device of FIG. 1 according to an embodiment of the invention.

In another embodiment, electro-optics 34 of an image capture device are provided as a multi-stage shifting apparatus. As shown in FIG. 3, a polarizer 36 at a set angle to two possible incoming polarizations that are perpendicular to each other may orient the polarization of the light from a LCP 38 and a birefringent element 40. In one embodiment where a polarizer 36 is set at 45°, the two possible orthogonal polarizations of incoming beams will create a beam polarized at 45°, to either of the incoming beams, but with a decrease in intensity of approximately fifty percent (including some losses). A second birefringent element 42, with the fast axis oriented parallel to the polarizer, will work with the first two orthogonally polarized incoming beams to create two focal positions. A third shift may be created with a second LCP element 44 positioned after the polarizer. If the second birefringent element 42 is of a different thickness or power from the first, then the two paths through the second element may be combined with each orientation in the first element to create two new path lengths for a total of four positions. If the second element 42 is the same as the first 40 in terms of the shift generated, then using the second path (long path) through the second element with the first path (short path) of the first element is equivalent to using the short path in the second element and the long path in the first element. This would result in a total of three measurable shift positions 46. In certain embodiments, a lens may be used in combination with the LCP wherein the focal length of the lens is changed when voltage is applied to the LCP.

Referring now to FIG. 4, an image capture device 14, according to one embodiment, is provided that includes a front imaging lens 50 that is used to form an intermediate image 52 of the subject 54, at a predetermined f-number and DOF, along with a second imaging lens 56 to adjust the magnification onto a camera 58. LCP 60, combined with birefringent lenses 62, may be used as the field optics near the intermediate image. Except for some curvature of the field, the birefringent lenses 62 have a minimal effect on the resolution quality of the image, and the position of the lenses can be adjusted to provide the amount of shift needed. A telecentric stop 64 is also used to control magnification.

The magnification of the primary and camera lens may be chosen to create the desired focal shift at the finger scanning position. In certain embodiments, if an increase in focal shift is desired, a magnifier lens (not shown) may also be used along with the birefringent lenses 62 near the intermediate image location. For example, if a shift of 4 millimeters is desired at the finger scanning position, but only a 1 millimeter is created at the intermediate image 52 by the birefringent lens 62 element, then the image may be magnified from the intermediate image to the finger by 2×, which in focal distance would be a change of 4× (the longitudinal magnification is the square of the lateral magnification).

As shown in FIG. 5, according to another embodiment of image capture device 14, birefringent lens elements 62 along with one or more LCP elements 60 may also be placed in front of or behind (finger or sensor side) a single imaging lens 66 at a distance shorter than the focal length of the birefringent lens element 62, and may function as a magnifier lens or close up diopter lens. In FIG. 5 LCP elements 60 are shown in both locations.

In certain embodiments, one or more polarizing beam splitting cubes may be used with the LCP(s). In one embodiment, a beam splitting polarizer cube may be used to reflect the light at 90° relative to the incident direction so as to traverse a longer path than one, which goes directly through the cube. A cube may be used wherein the cube comprises two right angle prisms joined along their large faces to form a cube and with two side faces having a quarter wave retarder rotationally oriented at 45° between the cube and a mirror. A thin film stack of alternating high and low index materials on one of the large faces polarizes the incident light reflecting "s" polarized light and transmitting "p" polarized light. The terms "s" polarized light and "p" polarized light are defined relative to the normal plane of incidence light on the optical interface. If the light is composed of a component of the electric field along the axis orthogonal to the plane of incidence it is referred to as "s" polarized, if it is parallel to the plane of incidence it is referred to as "p" polarized.

Figure 6:
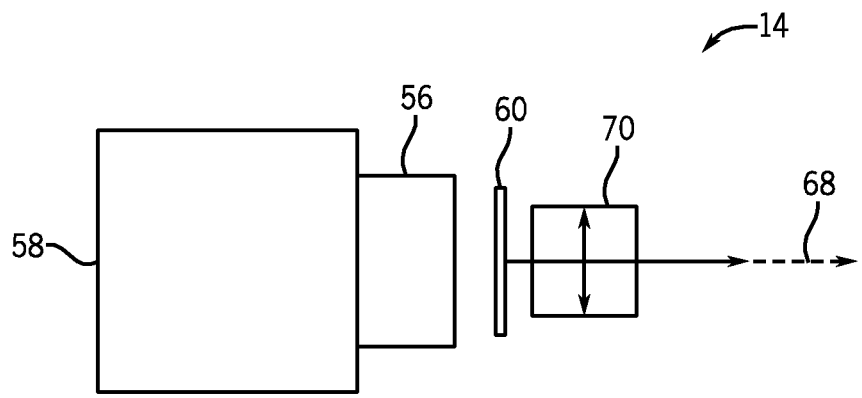
FIG. 6 is an illustration of an apparatus using polarizing beam splitting cubes that is usable with the contactless multi-fingerprint collection device of FIG. 1 according to an embodiment of the invention.

Referring now to FIG. 6, according to one embodiment, an image capture device 14 is provided where changes made by the LCP 60 may cause the image path 68 to pass directly through a beam splitter cube 70, or to reflect off the two sides of the cube 70 before passing through to generate a second path 3× longer through the cube than the first. Using two such cubes together allows for three or four focus positions as before. If the cubes are different sizes, then the combinations provides four positions, if they are the same size there are only three unique positions.

Figure 7:
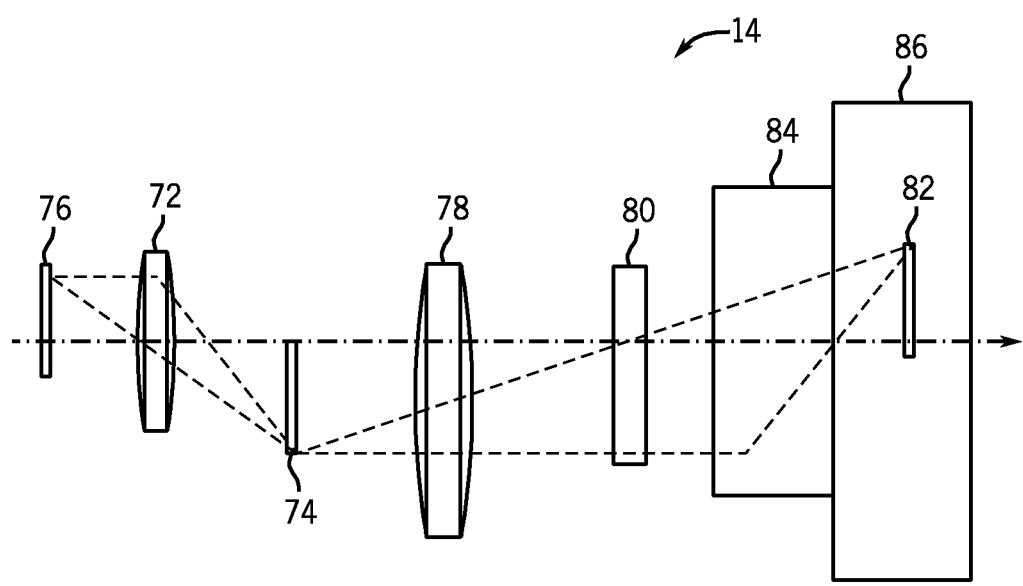
FIG. 7 is an illustration of a system using one birefringent lens and one LCP to create two focal positions that is usable with the contactless multi-fingerprint collection device of FIG. 1 according to an embodiment of the invention.

Referring now to FIG. 7, according to another embodiment, an image capture device 14 includes a front imaging lens 72 used to create an intermediate image 74 of a finger 76 (represented as a solid line). The birefringent element lens 78 is positioned as a field lens close to the intermediate image 74 created, but with a small displacement. In this configuration, the birefringent lens 78 acts as a magnifier and creates a virtual image (not shown). Two virtual images at different distances from the lens are created, one each for the two polarization orientations selected by the LCP 80.

The virtual images were imaged 82, by the camera imaging lens 84, onto the camera 86. Depending on the voltage setting of the LCP 80, one of the two image positions is seen by the camera 86. Using the thin lens formula, $1/f=(n-1)/r=1/o+1/s$, where f is the focal length, r is the radius of the lens, o is the object distance, and s is the image distance, the shift in image distance between the two values of refractive indices (n) is calculated. To create four images, a system, which includes two birefringent lens elements and two LCPs of a similar structure to that shown in FIG. 7, may be used.

Referring back to FIG. 1, it is recognized that in order for the multi-fingerprint contactless fingerprint collection device 10 to acquire fingerprint data for each finger of a subject, it is recognized that each finger of the hand of the subject must be properly positioned within the imaging volume 20 and relative to the one or more image capture devices 14. That is, it is recognized that each finger of the subject must be properly positioned a desired/designated distance from the image capture device(s) 14, so as to accommodate in-focus images of the fingers at a specified depth. To achieve this, a user interface 88 is provided for contactless multi-fingerprint collection device 10 that includes positioning assistance devices and positioning verification devices that aid and verify positioning of the subject's hand relative to the image capture device(s) 14. Such positioning assistance devices and positioning verification devices of the user interface 88 may be provided in a variety of forms, with the positioning assistance devices, for example, providing visual, audible, or tactile feedback to a subject to assist in positioning fingers in a desired imaging location.

According to one embodiment, and as shown in FIG. 1, the user interface 88 includes a display 90 that functions as a visual-type positioning assistance device by directing the subject to position and orient their hand properly within imaging volume 20. The display 90 provides a virtual guide for the subject by illustrating the hand within the imaging volume 20 relative to one or more virtual objects that depict a desired placement of the subject's fingers.

Figure 8:
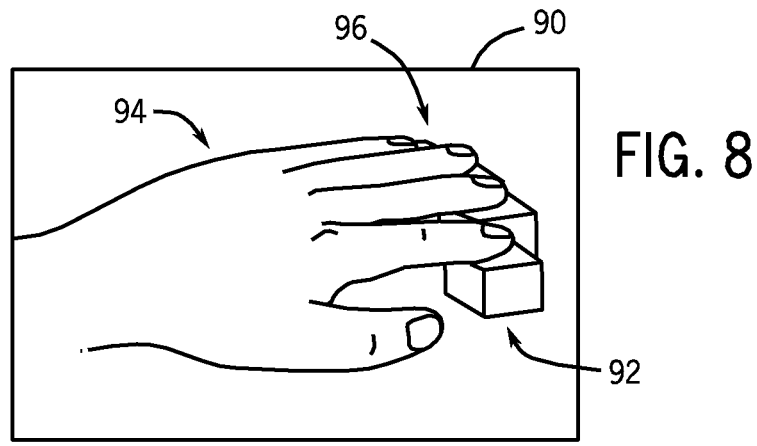
FIGS. 8-12 are illustrations of virtual positioning assistance devices that are usable with the contactless multi-fingerprint collection device of FIG. 1 according to embodiments of the invention.

Referring now to FIG. 8, according to one embodiment of the invention, the virtual guide displayed on display 90 is in the form of a plurality of virtual cubes 92 that are visible to a subject on display 90 and in which fingers of the subject are placed. The virtual cubes 92 are displayed on display 90 along with the hand 94 of the subject, with each of the virtual cubes 92 corresponding to a respective finger 96 of the subject. Each virtual cube 92 corresponds to a field-of-view of a respective image capture device 14 (FIG. 1) designated for each finger, with the virtual cubes 92 being designed to accommodate a variety of hand and finger sizes that incorporates most of the adult human hand size and shape variation, and thus each cube 92 encompasses a volume several times greater than a size of a normal finger. In operation, subject moves their hand and fingers within the imaging volume 20 (FIG. 1) of the contactless multi-fingerprint collection device, with movement of the subject's fingers 96 being illustrated on display 90 relative to virtual cubes 92. By way of the display 90, the subject thus places their fingers 96 within the virtual cubes 92, thereby positioning the fingers at a desired location within imaging volume 20 and relative to image capture devices 14 for multi-fingerprint image capture.

Figure 9:
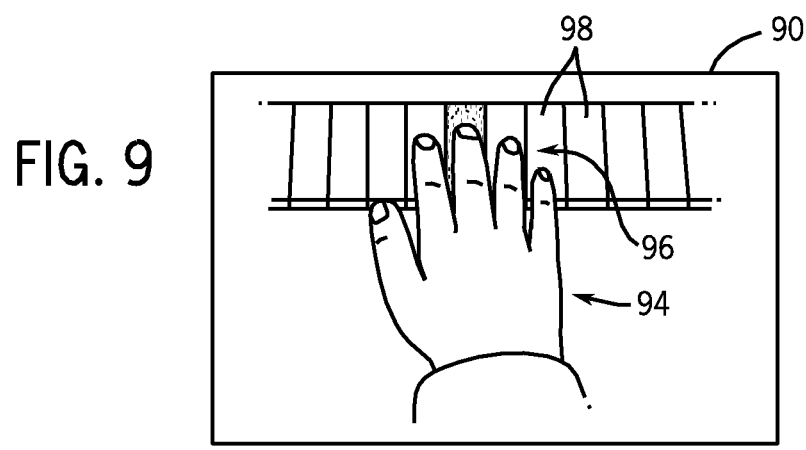

Referring to FIG. 9, according to an embodiment of the invention, the virtual guide provided on display 90 is in the form of virtual keys 98 that are visible to a subject. The virtual keys 98 can be termed as a virtual "keyboard" or "piano" that includes a plurality of individual keys 98. In operation, a subject clicks the virtual keys 98 by moving their fingers 96 into contact with respective keys 98, as visible on the display 90, thereby positioning the fingers at a desired location for multi-fingerprint image capture by the image capture devices 14 (FIG. 1). According to one embodiment, and as shown in FIG. 9, the color of a virtual key 98 would change on display 90 when "pressed" by a finger 96 of the subject, so as to verify an acceptable positioning of the subject's finger in contact with that key 98. According to another embodiment, in addition to altering the color of the virtual keys 98, an audible positioning assistance device could be implemented in conjunction with the display of virtual keys 98. For example, an audible clicking sound could be generated when a virtual key 98 is pressed by a finger 96 of the subject, so as to provide further verification or notice to the subject that a finger is in an acceptable imaging position. Alternatively, a series of pitched notes could be generated when successive virtual keys 98 are pressed by fingers 96 of the subject, so as to provide further verification or notice to the subject that fingers are in an acceptable imaging or capture position.

Figure 10:
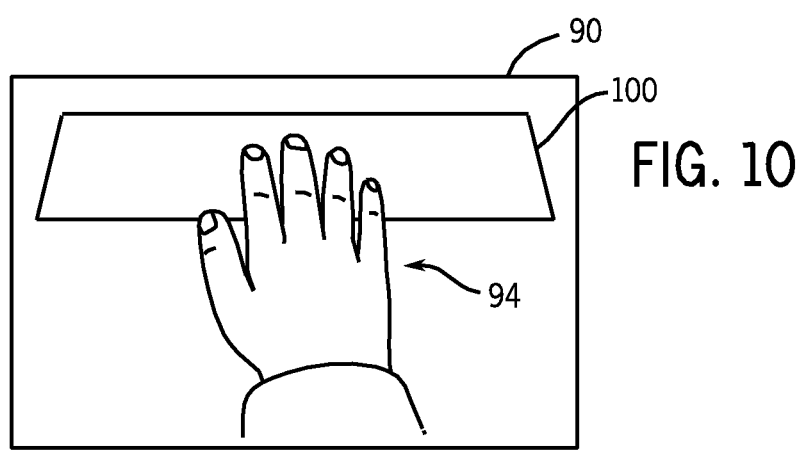

Referring now to FIG. 10, according to another embodiment of the invention, the virtual guide provided on display 90 is in the form of a virtual plane 100. In operation, a subject tracks movement of their hand within imaging volume 20 by way of display 90 and uses the display 90 to place their hand in contact with the plane 100 or "touch" the plane 100. An image of the subject's hand 94 changes color on display 90 upon touching or passing through the plane 100. According to one embodiment, the virtual plane 100 is positioned off of an in-focus plane in which the subject's hand is desired to be placed in for imaging. Positioning the virtual plane 100 off of the in-focus plane serves to ensure that the touching of the subject's hand 94 to the virtual plane 100 passes the hand through the in-focus plane, so as to provide for high resolution fingerprint image acquisition.

Figure 11:
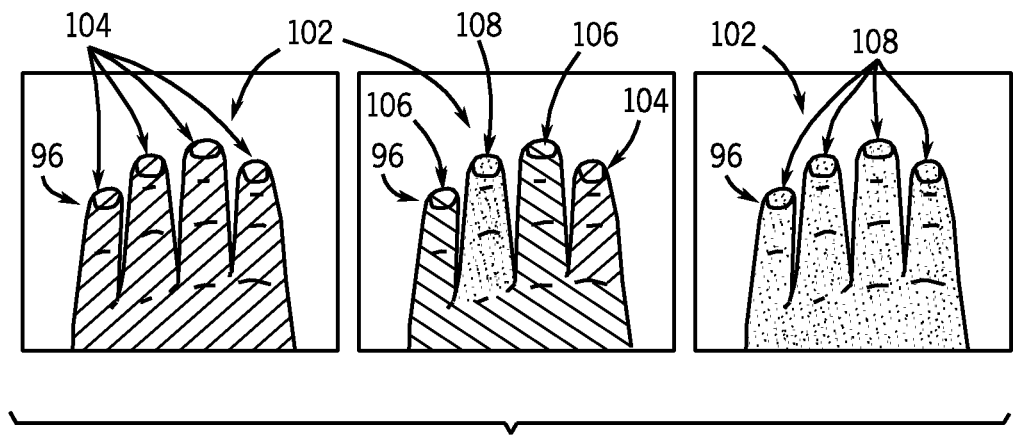

According to another embodiment, and as shown in FIG. 11, display 90 provides a virtual guide in the form of a multi-color virtual image of the hand 102 of the subject. The multi-color hand image 102 is configured to change color based on the proximity of each finger 96 to a desired imaging location (i.e., an in-plane imaging location). For example, the hand image 102 may initially be presented on display 90 in an orange color 104 upon placement of the hand into the imaging volume 20 of contactless multi-fingerprint collection device 10 (FIG. 1), thus indicating that the hand is a large distance from the desired imaging location. As the subject moves their hand further into the imaging volume 20 and closer to the desired imaging location, the color of individual fingers, or the whole hand, changes on display 90 to a blue color 106 to indicate that the fingers/hand is approaching the desired imaging location. Upon further translation of one or more of the subject's fingers, a display of any fingers that move into the desired imaging location will change on display 90 to a green color 108, so as to verify to the subject an acceptable positioning of one or more fingers.

Figure 12:
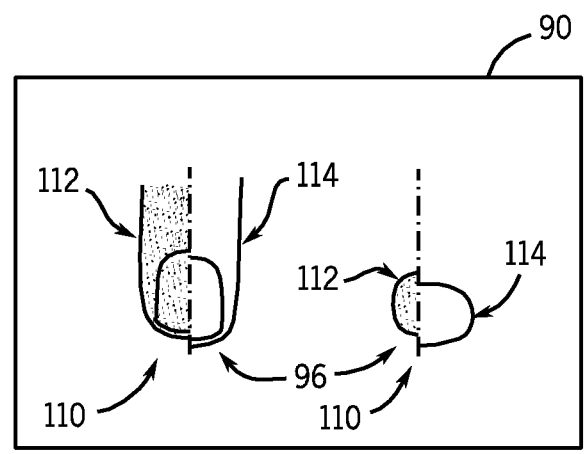

According to another embodiment, a virtual guide provided on display 90 is provided in the form of a split view, multi-color virtual image of the hand 110, as shown in FIG. 12. The split view image 110 makes use of varying colors to indicate to the subject the proximity of each finger 96 to a desired imaging location. The split view image 110 presents any portion of the finger/hand that is out of focus in one color 112 (e.g., orange) on one side of the split view 110, while any portion of the finger/hand that is in focus is displayed in another color 114 (e.g., green) on the other side of the split screen 110. Movement of the hand of the subject is thus guided by way of the split view image 110, with the screen providing verification or notice to the subject that a finger is in an acceptable imaging position.

Referring back again to FIG. 1, according to one embodiment, the contactless multi-fingerprint collection device 10 includes a viewing window 116 in an upper surface of housing 12 that functions as a visual-type positioning assistance device by aiding the subject in properly positioning their hand within the imaging volume 20 via allowing the subject to view their hand within the imaging volume 20. According to one embodiment, viewing window 116 is formed as a transparent window with a color pass filter in parallel to using a color block filter for the same color to block ambient light from accessing the imaging volume 20. The blocked light will be of the same wavelength of those wavelengths used to image the fingers and the passed light wavelength will be different from the wavelengths used to image the fingers. In conjunction with viewing window 116, an active light source or aid 118 is provided as a visual-type positioning assistance device that generates a visible light guide within imaging volume 20 for guiding a subject's hand placement, according to an embodiment of the invention.

Figure 13:
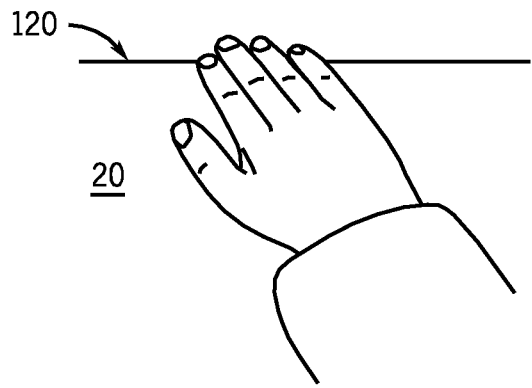
FIGS. 13-15 are illustrations of active light aid positioning assistance devices that are usable with the contactless multi-fingerprint collection device of FIG. 1 according to embodiments of the invention.
Figure 14:
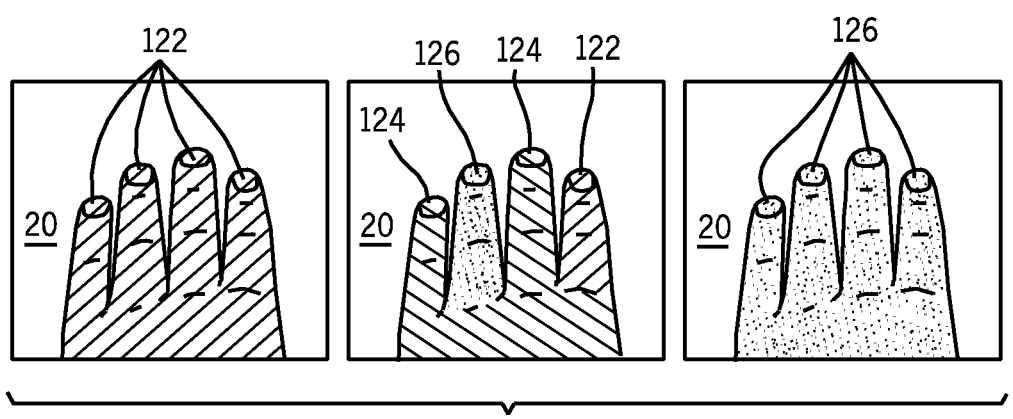
Figure 15:
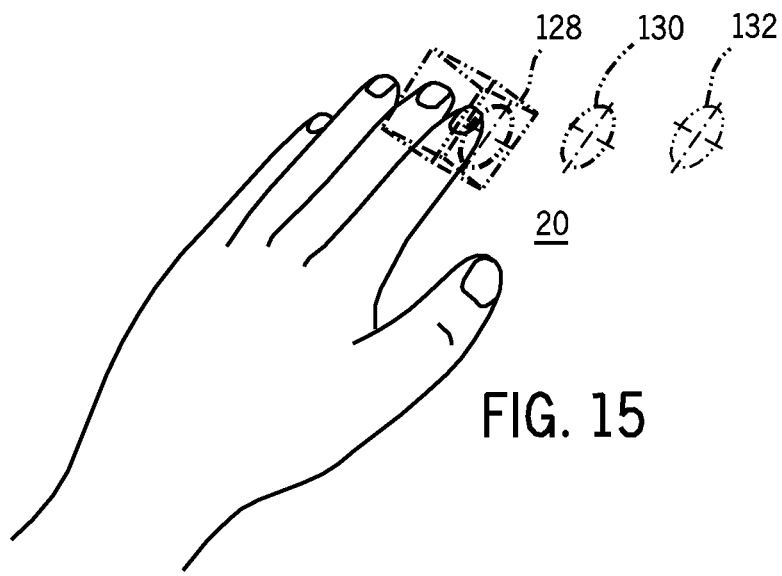

Referring now to FIGS. 13-15, and with continued reference to FIG. 1, various embodiments of a visible light guide are illustrated that can be generated by active light source 118. According to one embodiment, and as shown in FIG. 13, a beam of visible light 120 is generated within imaging volume 20 by light source 118. In order to position their fingers in a desired imaging location relative to the image capture devices 14, the subject moves their hand within the imaging volume 20 so as to come in contact with or break the beam of visible light 120. The subject is able to view a position of their fingers relative to the light beam 120 by way of viewing window 116, and thus can easily determine when their fingers come in contact with the light beam 120.

According to another embodiment, and as shown in FIG. 14, a visible light guide is generated by light source 118 (FIG. 1) that functions to illuminate the hand of the subject in differing colors when placed in the imaging volume 20. Light source 118 is in the form of multi-color lights that are provided within imaging volume 20 and selectively illuminate a subject's hand. Similar to the multi-color hand image generated on the display 90 for FIG. 11, the hand and fingers of the subject that are within imaging volume 20 are illuminated by light source 118 based on the proximity of each finger to a desired imaging location (i.e., an in-plane imaging location). For example, as shown in FIG. 14, the hand may be illuminated by light source 118 in an orange color 122 upon placement of the hand into the imaging volume 20 of contactless multi-fingerprint collection device, thus indicating that the hand is a large distance from the desired imaging location. As the subject moves their hand further into the imaging volume 20 and closer to the desired imaging location, individual fingers, or the whole hand, light source 118 is controlled to illuminate certain fingers in a blue color 124 to indicate that such fingers are approaching the desired imaging location. Upon further translation of one or more of the subject's fingers, any fingers that move into the desired imaging location may be illuminated by light source 118 in a green color 126, so as to verify to the subject an acceptable positioning of one or more fingers.

Referring now to FIG. 15, according to still another embodiment, a visible light guide is generated by light source 118 (FIG. 1) in the form of a structured light guide. That is, as shown in FIG. 15, multiple bulls eye targets 128, 130, 132 are provided to assist the subject in placing their fingers in a proper lateral position with imaging volume 20 and at a desired depth relative to image capture devices 14 (FIG. 1). According to one embodiment, subject is directed to position their hand such that bulls eye target 128 hits the center of the hand, thereby ensuring a proper lateral position of the hand within imaging volume 20. The subject then positions his/her fingers to hit bulls eye targets 130, 132 such that the fingers are positioned at a proper depth relative to image capture devices 14, to provide for fingerprint capture images to be acquired.

In each of the visual-type positioning assistance devices of FIGS. 8-15, it is recognized that various tactile and/or audible positioning assistance devices may be further incorporated therewith, to further aid a subject in positioning their hand in a proper imaging position. A tactile or physical guide can be provided in the form of a forced stream of air that guides the hand of the subject into a desired imaging position. According to one embodiment, air jets are provided on four sides of the imaging volume 20 and emit regulated jets of air to urge the subject's hand in a particular direction. According to another embodiment, a plane of forced air is provided that creates a virtual palm rest on which the hand of the subject is placed, such that the hand is stabilized and maintained in a desired position to allow for accurate imaging.

An acoustic guide can also be provided to assist in positioning of the hand of the subject. According to one embodiment, the acoustic guide is in the form of a beep having a controlled pitch that is based on a proximity of the hand of the subject to the desired imaging location, with the pitch of the beep increasing as the hand moves closer to the desired imaging location. According to another embodiment, the acoustic guide is in the form of a series of clicks, with the frequency of the clicks being based on a proximity of the hand of the subject to the desired imaging location. As the hand of the subject moves closer to the desired imaging location, the frequency of the clicks is increased. According to still another embodiment, the acoustic guide is in the form of audio vibrations that can be felt by the subject and that act as feedback to direct the hand/fingers to a desired imaging/capture location.

For each of the positioning assistance devices set forth in the embodiments of FIGS. 8-15, positioning verification devices are used in conjunction therewith to verify positioning of the subject's hand relative to the image capture device(s) of the contactless multi-fingerprint collection device. With respect to the virtual guides generated for display 90, the positioning verification devices are implemented to provide position information of the subject's hand such that a virtual image of the hand can be generated. Referring again to FIG. 1, one or more positioning verification devices 134 are provided to help the subject position his/her hand in a desired image capture position within imaging volume 20. According to an exemplary embodiment, positioning verification device 134 includes an overhead hand display camera 134 with video analytical capability, with the camera 134 providing for 3D virtual images on display 90 of the subject's hand. Additionally, the positioning verification device 134 can include 3D position sensors that determine when the finger is in the best location to automatically acquire a set of images for generating a fingerprint. The sensors can be proximity sensors (sensing 1-3 directions of proximity), such as a proximity triangulation gauge that implements a laser or light emitting diode beam. Alternatively, the positioning verification device 134 could be provided in the form of a multiple camera based triangulation gauge.

In each of the embodiments set forth above, positioning verification device 134 functions to determine an exact location of the hand/fingers of the subject within imaging volume 20 and a proximity of fingers to a desired/optimal location. Positioning verification device 134 thus is able to determine when fingers of the subject are in the desired/optimal location for image capture via image capture device(s) 14. According to an exemplary embodiment, proximity sensors form at least one device of the one or more position verification devices 134, and are registered with image capture device(s) 14 so as to cause the image capture device(s) 14 to automatically capture multi-fingerprint images from the subject upon detection of finger placement at the desired/optimal imaging location.

According to additional embodiments of the invention, and as referenced above, the contactless multi-fingerprint collection device is configured to acquire fingerprint data for the fingers of the subject without the subject's hand being in a stationary position, but rather being moved (i.e., swiped or waved) through the imaging volume 20. That is, rather than guiding the subject to place their fingers in a specified image capture location (such as via the positioning assistance devices of FIGS. 8-15), the contactless multi-fingerprint collection device 10 acts to track a location of the subject's fingers and cause the image capture device(s) 14 to acquire images of the fingers.

According to embodiments of the invention, the one or more positioning verification devices 134 also include devices (e.g., overhead camera) that function as tracking devices that are used to verify and track movement of a subject's hand within the imaging volume 20 for purposes of controlling the image capture devices 14. That is, a field-of-view and focus depth of each image capture device 14 can be independently set based on a movement and placement of the subject's hand/fingers as tracked by tracking devices 134, so as to enable following of individual fingertips. The moving of the field-of-view of each image capture device 14 can be accomplished via a mechanical actuation of one or more elements or via an electronic/digital controlling of each image capture device. For example, in an embodiment where one or more elements are mechanically actuated to move the field-of-view, a mirror positioned adjacent the image capture device could be rotated or a lens element could be moved in order to shift the field-of-view of the image capture device. In an embodiment where electronic or digital controls are implemented, a sensor in the image capture device (i.e., camera sensor) could be controlled to shift the field-of-view of the image capture device.

Figure 16:
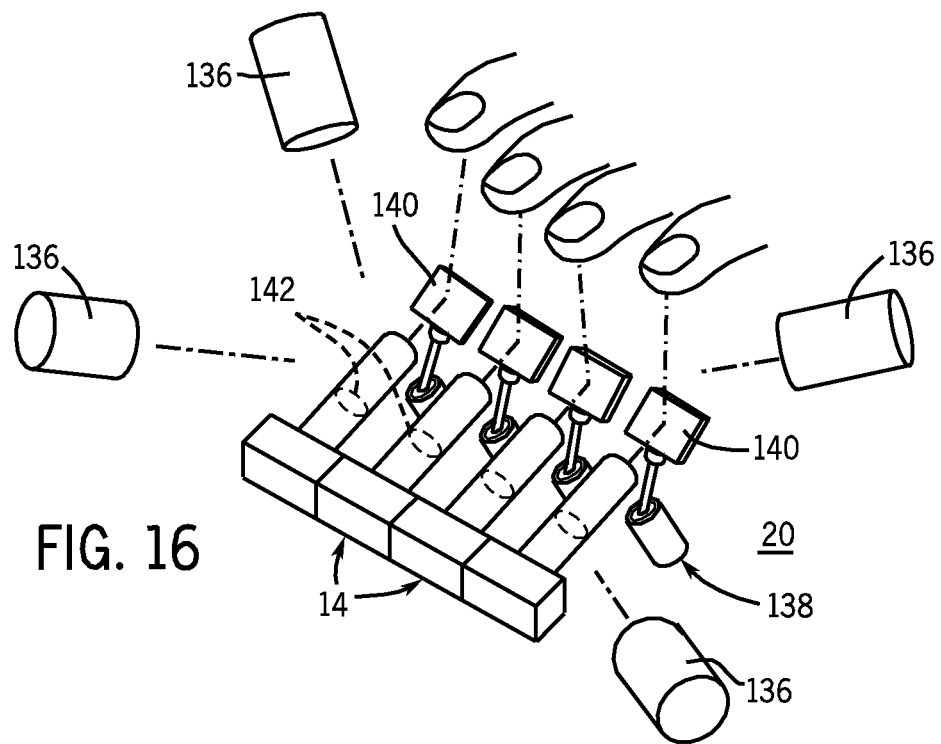
FIGS. 16-20 are illustrations of active camera image capture devices usable with the contactless multi-fingerprint collection device of FIG. 1 according to embodiments of the invention.

Referring to FIG. 16, according to one embodiment, a plurality of image capture devices 14 are employed to acquire simultaneous fingerprints from the fingers of the subject. Tracking devices, such as multiple tracking cameras 136, are used to determine a location of fingers within the imaging volume 20 relative to the image capture devices 14. The location of each finger, as determined by the tracking devices 136, is relayed to actuating devices, such as piezoelectric actuators, voice coils, or large step LCPs, which function to determine and control the field-of-view and focus depth of the image capture devices 14, so as to provide for capture of in-focus images of the fingers. For example, a first actuating device 138 such as piezoelectric actuators or voice coils may be employed to actuate a mirror 140 positioned adjacent a respective image capture device 14 to set a field-of-view for the device 14 that encompasses a finger, while LCPs 142 are employed to set a desired focus depth of each image capture device 14. The ability to vary the field-of-view and focus depth of the image capture devices 14 by way of rotating mirror(s) 140 (via actuating devices 138, 142) thus allows for contactless multi-fingerprint collection device 10 (FIG. 1) to accommodate a wide range of subject hand sizes.

Figure 17:
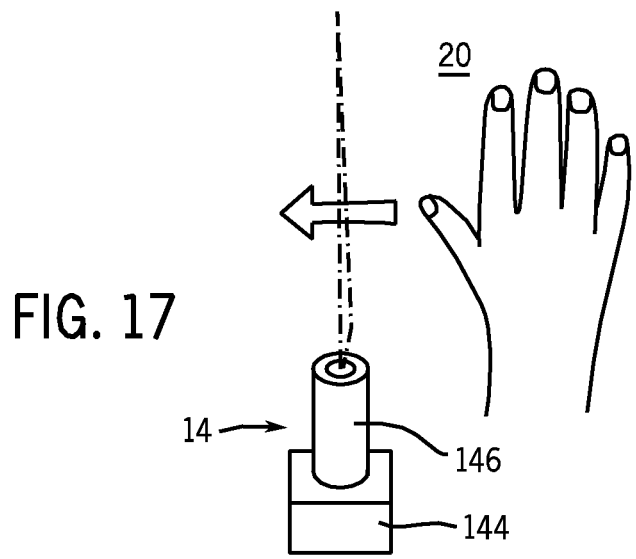

Referring now to FIG. 17, according to an embodiment of the invention, the contactless multi-fingerprint collection device employs an image capture device 14 that includes a line scan camera 144 (i.e., LCP and birefringent lens), so as to provide for simultaneous capture of multiple fingerprints when a subject swipes or waves their hand through the imaging volume 20. A single line scan camera 144 is provided for capturing images of the subject's fingers as the subject swipes their land in a lateral motion through the field-of-view of the camera 144. The field-of-view of the camera 144 is configured so as to incorporate most of the adult human hand size and shape variation, so as to accommodate a wide range of subject hand sizes. According to the embodiment of multi-fingerprint collection device shown in FIG. 17, the image capture device 14 includes and electro-optics 146 having one or more LCPs and one or more birefringent lens. Thus, in order to acquire accurate images of the subject's fingers, the subject must pass their hand through the field-of-view of the image capture device 14 at a constant depth relative thereto (i.e., in a strictly horizontal direction). Passing of through the field-of-view at a constant depth allows for image capture device 14 to acquire images at a plurality of defined depths via electro-optics 146, such that accurate/high resolution images of the subject's fingerprints can be generated.

Figure 18:
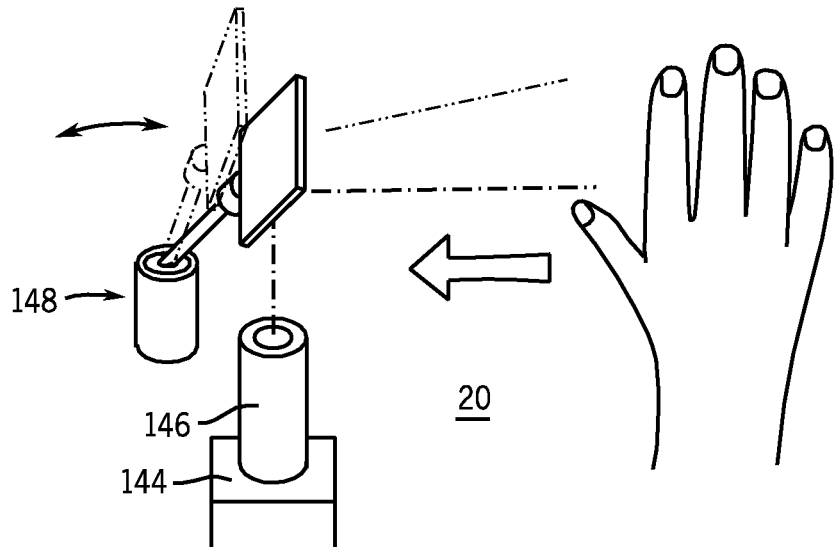

According to another embodiment, and as shown in FIG. 18, the contactless multi-fingerprint collection device 10 (FIG. 1) employs an image capture device 14 that includes a line scan or area camera 144 to provide for simultaneous capture of multiple fingerprints when a subject swipes or waves their hand through the imaging volume 20. Additionally, a tracking device(s) 148 (e.g., overhead camera) is used to verify and track movement of a subject's hand within the imaging volume 20 for purposes of controlling the imaging device 14. Tracking device 148 functions to determine a location of the subject's hand/fingers to enable proper focus depth of the image capture device 14 and provide for capture of in-focus images of the fingers. For example, tracking device 148 may cause a large step LCP in electro-optics 146 to actuate, such that a desired focus depth for image capture device 14 is achieved.

Thus, as tracking device 148 controls the image capture device 14 (e.g., setting a configuration of LCPs) to capture an image having an appropriate focus depth, the subject is allowed a more relaxed cooperation with the system as compared to the embodiment of FIG. 17. That is, subject can swipe their hand through the imaging volume 20 in a generally lateral motion without necessarily maintaining their hand at a constant depth relative to the image capture device 14, while still allowing for image capture device 14 to capture in-focus multi-finger print images.

Figure 19:
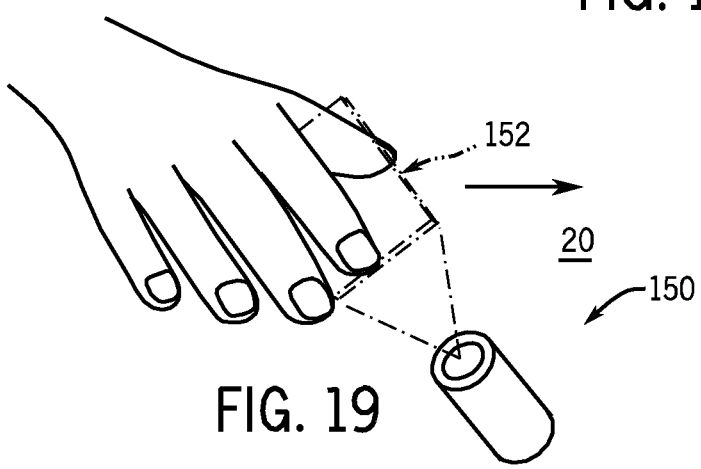

Referring now to FIG. 19, according to an embodiment of the invention, a line scan camera 150 is provided at an angle (i.e., is tilted) relative to a lateral path of movement of the hand of the subject through the imaging volume 20 of the multi-fingerprint collection device. The tilting of the line scan camera 150 relative to the trajectory of the subject's hand enables capture of fingerprint images at multiple depths without the need for LCPs. That is, each finger that passes through an angled field-of-view 152 of the line scan camera 150 (based on the tilting of the camera 150), thereby providing for the capture of images of each finger at multiple depths, without the need to actuate an LCP for purposes of changing the length of an optical path between the camera 150 and the finger.

Figure 20:
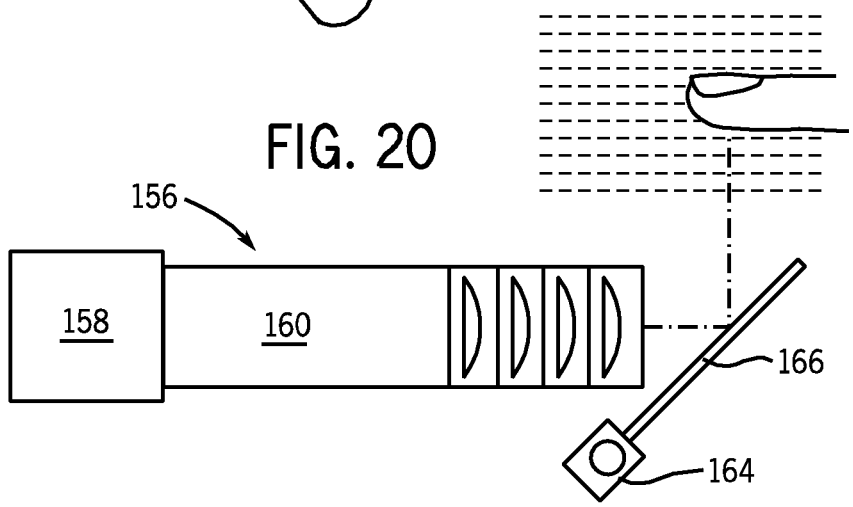

Referring to FIG. 20, a single image capture device 156 is provided for capturing fingerprint images of all fingers as the subject moves their hand through the imaging volume 20. The image capture device 156 includes a single camera 158 for acquiring images and electro-optics 160 for providing multiple focus planes in imaging the fingers. The imaging optics 160 include a plurality of LCPs, such as 3 or 4 LCPs for example, that provide for up to 8 to 16 focus planes with redundancy between the planes, so as to allow for a large number of images of the fingers to be acquired (i.e., oversampling). A tracking device is employed along with an actuating device 164 having multiple degrees of freedom that functions to control positioning/orientation of a mirror 166 so as to set a field-of-view for the image capture device 156 that encompasses desired finger(s). The ability to vary the field-of-view and focus depth of the image capture device 156 thus allows for contactless and simultaneous multi-fingerprint collection.

Upon capture of the fingerprint images of the subject by contactless multi-fingerprint collection device 10, via any of the image capture devices described above, the data is transferred to a processor (not shown) included in device 10. The processor obtains 3D depth information for each fingerprint that is used to create a 2D rolled equivalent type image from the calculated depth of the structural features and the high-resolution fused image. An algorithm is used wherein the algorithm simulates the image distortions obtained when using a contact fingerprinting method. The image may then be compared to roll-type fingerprint images such as those stored in a fingerprint database system or in similar sources.

Figure 21:
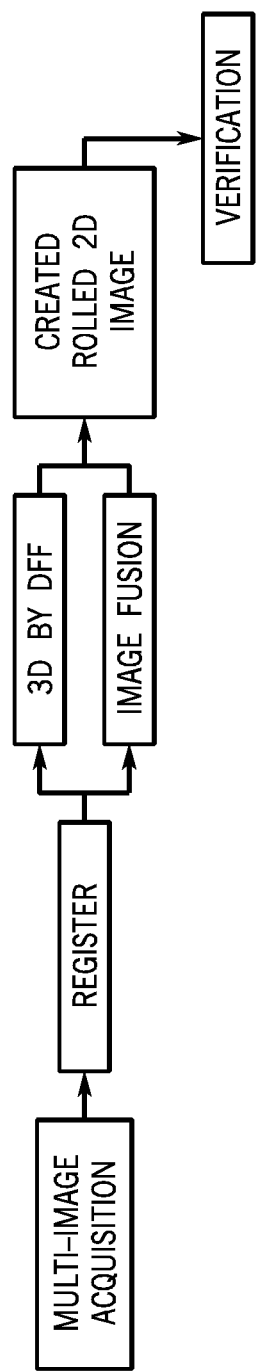
FIG. 21 is a process flow diagram used for contactless fingerprint verification according to an embodiment of the invention.

FIG. 21 shows the process steps involved in one such embodiment. The process steps comprise image acquisition of multiple images of a fingerprint obtained from different optical path lengths, transfer of the acquired image using a processor and image registration of the multiple images. The process steps further comprise fusion of the multiple images into a composite image, determination of depth using depth from focus (DFF) or depth from defocus (DFD) calculations, creation of a rolled two-dimensional (2D) image, and comparison of the 2D image to a finger print data base for verification. The images obtained may be stored at various points along the process.

Various methods may be used to register the image. As used herein registration refers to a process of transforming the different images of a single subject into one coordinate system. In the context of a fingerprint, registered images are derived from the captured images of the fingerprint. The registered images have the same scale and feature position.

In order to ensure the features from the multiple shifted images are approximately registered, a telecentric lens system is also commonly used that maintains magnification within a narrow range. However, the addition of a telecentric aperture inherently increases the f-number and may result in an excessive depth-of-field.

In certain registration embodiments, registration may use a geographic information system (GIS) employing ortho-rectification. Ortho-rectification is a process of remapping an image to remove the effect of surface variations and camera position from a normal perspective image. The resultant multiple images are perspective corrected projections on a common plane, representing no magnification changes with a pixel to pixel correspondence. In certain embodiments, ortho-rectification may comprise un-distorting each captured image using 3D calibration information of the image capture device, and projection of the image onto one plane.

Once the images are registered, image fusion is used to create a single high-resolution image from the multiple images of the same target. Generally, image fusion is the procedure of combining information from multiple images into a single image whereas in the said embodiment this information relate to the local, spatial focus information in each image. The re-fused image would desirably appear entirely in-focus while the source images are in-focus in different, specific regions. This may be accomplished by using selected metrics. These metrics are chosen based on the fact that the pixels in the blurred portions of an image exhibit specific different feature levels, in comparison to those pixels that are in good focus. For example, focused images typically contain higher frequencies while blurred images have lower frequency components.

Figure 22:
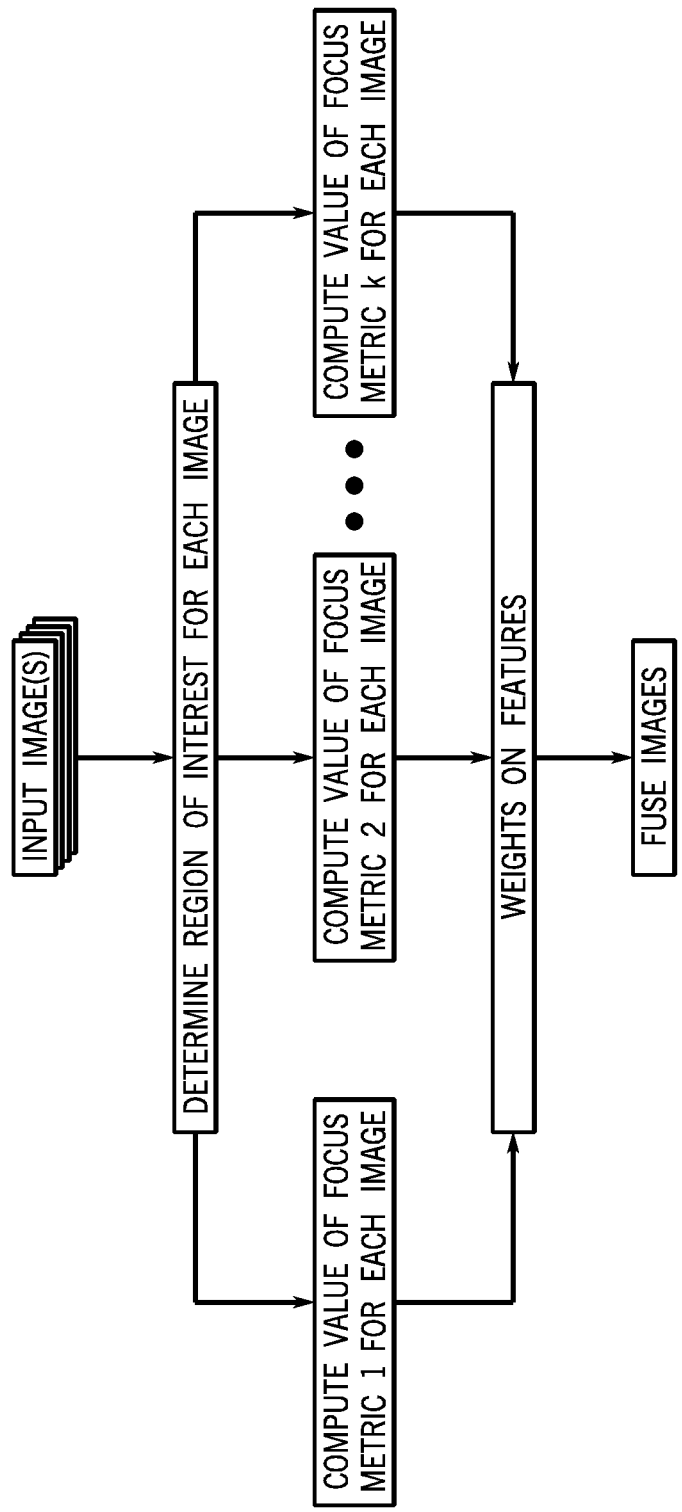
FIG. 22 is a flow diagram of an image fusion approach used to combine multiple images according to an embodiment of the invention.

In certain embodiments, certain metrics may be used to compute the level of focus for each pixel in each separately obtained image of the fingerprint. The separate images are then normalized and combined using a weighted combination of the pixels to obtain a single fused or composite image. An overview of the aforementioned image fusion approach is shown in FIG. 22. As shown in the process steps, for each of the acquired images, the region of interest is determined by image segmentation. From the different metrics the focus at each location in the image is calculated as a weighted combination of features, then the images are combined using said local weighted combination of the features.

Upon generation of a composite image of a fingerprint, a contour map or "depth map" of the composite image for each of the plurality of fingerprints is calculated/generated using one of a depth from focus (DFF) and a depth from defocus (DFD) algorithm. The depth from focus analysis/calculation is an image analysis method combining multiple images captured at different focus distances to provide a 3D map correlating in-focus locations in each image with a known focus distance the specific image was captured at. The depth from defocus analysis/calculation is an image analysis method combining multiple images captured at different focus distances for calculating depth information by computing the degree of blur.

In order to match the fingerprint images captured to standard databases based upon 2D data capture, the 3D model obtained from the DFF or DFD algorithm may be used to generate an unrolled 2D image. The model used, simulates the image distortions corresponding to the reverse of the projection of the fingerprint surface on a two-dimensional projection obtained in a contact method.

In one embodiment a 3D point cloud data set is generated based on pixel intensities from the plurality of polarized images. The 3D point cloud represents the visible surface of the finger. The 3D point cloud is subsequently used to create a distortion map. An algorithm, based on the distortion map transforms the pixel space of the fused image into a new pixel space. The new pixel space simulates the image distortions that would be obtained using a contact type fingerprint method.

Figure 23:
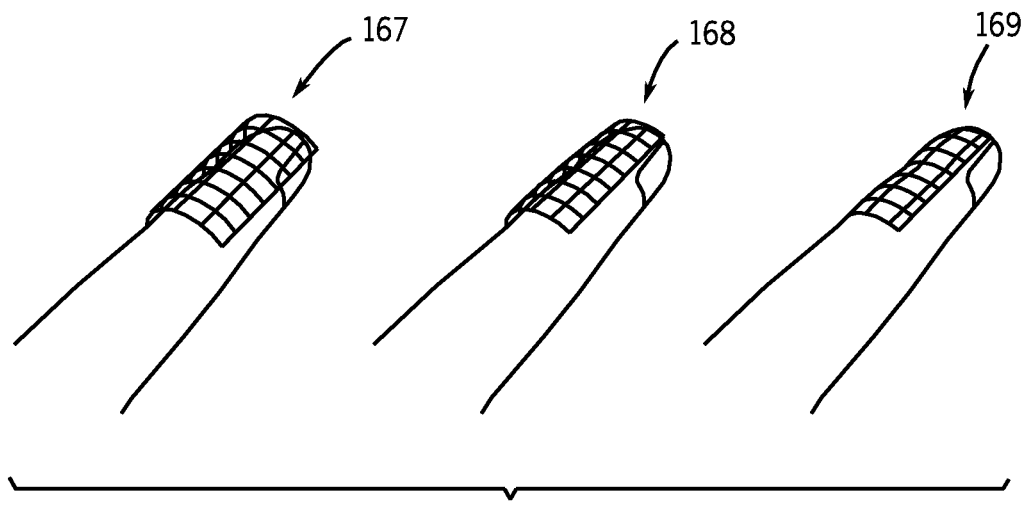
FIG. 23 is an illustration of modeling techniques for determining finger dimensions for purposes of generating a fingerprint distortion map according to embodiments of the invention.

As shown in FIG. 23, in one embodiment, the distortion map may be based on a cylindrical approximation of a finger wherein the unrolled fingerprint width equals $\pi r$ is used (i.e., cylindrical model 167). As such, an angle subtended by an arc of unit length, $\theta$, is equal to $1/r$ in radians. Using the equation, an unrolled width is computed and each pixel assigned a projected location. Based on the projected location, a gray scale value is calculated.

Referring still to FIG. 23, in another embodiment, the distortion map may be based on an arbitrary curve assumption of the finger cross section perpendicular to the long dimension of the finger and a different arbitrary curve assumption representing the center of the finger along its long dimension (i.e., varying circular cross section and center curve model 168). In yet another embodiment, the distortion map may be based on a cylindrical assumption using multiple cross sections of the finger perpendicular to the long dimension of the finger and by applying a mathematical curve (e.g., Bezier curve) representing the center of the finger along its long dimension (i.e., higher polynomial cross section 169). A flow chart of the process, which results in an unrolled image, is shown in FIG. 24.

Figure 24:
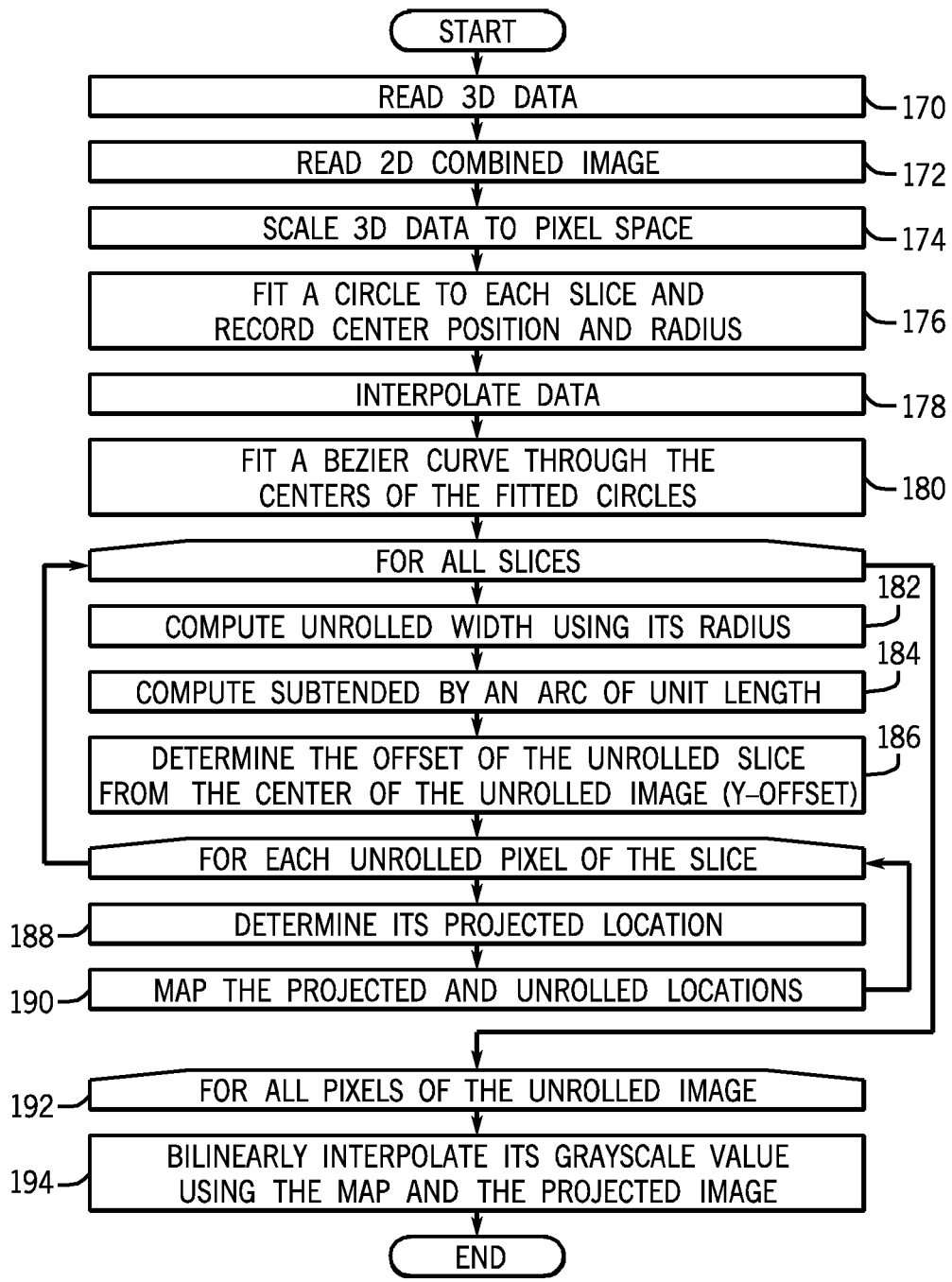
FIG. 24 is a flow diagram of a process used to convert a 3D image to an unrolled 2D image according to an embodiment of the invention.

In FIG. 24, the process steps are numbered and show a rolled equivalent algorithm may start with reading the 3D data 170 calculated before and the 2D combined image 172. The 3D data is scaled to 3D pixel space to correspond spatially to the 2D combined image 174. Each slice perpendicular to the finger direction is modeled as an arc 176. The 3D data is then interpolated to have data every pixel 178. A Bezier curve is fitted through the centers of the arcs 180 to create a smooth finger curvature. For each slice the unrolled width 182 and subtended angle of each pixel 184 are calculated. The offset unrolled slice from the center is determined 186. For each unrolled pixel the projected location is determined 188 and the location of the unrolled pixel is calculated 190. For each pixel 192 a bilinear interpolation is applied to get the corresponding pixel value 194.

Therefore, according to one embodiment of the invention, a contactless multi-fingerprint collection device for imaging a plurality of fingerprints includes an imaging volume configured to receive a hand of a subject for imaging the plurality of fingerprints, a user interface configured to provide feedback to the subject regarding a proximity of the hand to a desired imaging location within the imaging volume, and at least one image capture device to capture images of each of the plurality of fingerprints at each of at least two different depths from the fingerprints when the hand is at the desired imaging location. The contactless multi-fingerprint collection device also includes a processor coupled to the at least one image capture device that is programmed to generate a composite image and a contour map of each of the plurality of fingerprints from the images captured at the at least two different depths and generate a two-dimensional rolled equivalent image of each of the plurality of fingerprints from the composite image and the contour map.

According to another embodiment of the invention, a method for collecting images of multiple fingerprints of a subject in a contactless manner includes receiving a hand and fingers of a subject within an imaging volume of a contactless multi-fingerprint collection device and determining when the fingers of the subject are within a field-of-view of an image capture system of the contactless multi-fingerprint collection device within the imaging volume. The method also includes capturing fingerprint images of each of the fingers at each of at least two different depths from the fingerprints by way of the image capture system upon a determination that the fingers are within the field-of-view, registering and combining the fingerprint images captured at the at least two different depths to form a composite image of each of the plurality of fingerprints, calculating a depth map of the composite image for each of the plurality of fingerprints using one of a depth from focus and a depth from defocus algorithm, and generating a two-dimensional rolled equivalent image of each of the plurality of fingerprints from the composite image and the depth map.

According to yet another embodiment of the invention, a contactless multi-fingerprint collection device for imaging a plurality of fingerprints includes an imaging volume configured to receive a hand of a subject for imaging the plurality of fingerprints, at least one positioning verification device configured to determine a proximity of the fingers of the subject to desired imaging locations within the imaging volume, a positioning assistance device configured to provide feedback to the subject to aid in guiding fingers to the desired imaging locations within the imaging volume, and at least one image capture device configured to capture images of each of the plurality of fingerprints at each of a plurality of focus depths from the fingerprints, with the at least one image capture device being automatically triggered upon placement of the fingers at the desired imaging locations. The contactless multi-fingerprint collection device also includes a processor coupled to the at least one image capture device that is programmed to register and combine the fingerprint images captured at the plurality of focus depths to form a composite image of each of the plurality of fingerprints, calculate a depth map of the composite image for each of the plurality of fingerprints using one of a depth from focus and a depth from defocus algorithm, and generate a two-dimensional rolled equivalent image of each of the plurality of fingerprints from the composite image and the contour map.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A contactless multi-fingerprint collection device for imaging a plurality of fingerprints comprising:
   an imaging volume configured to receive a hand of a subject for imaging the plurality of fingerprints;
   a positioning assistance device configured to provide feedback to the subject to aid in guiding fingers to a desired imaging location within the imaging volume;
   a user interface configured to provide feedback to the subject regarding a proximity of the hand to the desired imaging location within the imaging volume, the user interface including a display screen;
   at least one image capture device to capture images of each of the plurality of fingerprints at each of at least two different depths from the fingerprints when the hand is at the desired imaging location; and
   a processor coupled to the at least one image capture device, the processor being programmed to:
      generate a composite image and a contour map of each of the plurality of fingerprints from the images captured at the at least two different depths; and
      generate a two-dimensional rolled equivalent image of each of the plurality of fingerprints from the composite image and the contour map;
   wherein the positioning assistance device comprises a 2-D hand image generated on the display screen that is indicative of a position of the hand of the subject within the imaging volume, the 2-D hand image comprising a color coded hand image configured to display each finger of the subject on the display screen in one of a plurality of colors based on a proximity of a respective finger to a desired imaging location.

2. The contactless multi-fingerprint collection device of claim 1 wherein the positioning assistance device further comprises an object image generated on the display screen indicative of the desired imaging locations within the imaging volume, the object image comprising one of a keyboard, a plurality of keys, and a plane.

3. The contactless multi-fingerprint collection device of claim 1 wherein the positioning assistance device comprises a structured light source to illuminate the hand of the subject within the imaging volume, the structured light source being configured to illuminate each finger of the subject in one of a plurality of colors based on a proximity of a respective finger to a desired imaging location.

4. The contactless multi-fingerprint collection device of claim 1 wherein the positioning assistance device comprises a structured light source configured to generate one of a light beam and a light plane within the imaging volume that is indicative of the desired imaging locations within the imaging volume.

5. The contactless multi-fingerprint collection device of claim 1 wherein the positioning assistance device comprises an audible positioning assistance device configured to generate controllable audible feedback to the subject indicative of a proximity of a finger of the subject to a respective one of the desired imaging locations.

6. The contactless multi-fingerprint collection device of claim 1 wherein the positioning assistance device comprises a tactile positioning assistance device configured to generate one of a jet of air and a plane of air to direct the hand and fingers of the subject to the desired imaging locations.

7. The contactless multi-fingerprint collection device of claim 1 wherein the user interface further comprises a positioning verification device configured to determine a position of the hand of the subject within the imaging volume, so as to identify when the hand is positioned at the desired imaging location within the imaging volume.

8. The contactless multi-fingerprint collection device of claim 7 wherein the positioning verification device comprises one or more of an overhead hand display camera, a multiple camera based triangulation gauge, or a plurality of proximity sensors.

9. The contactless multi-fingerprint collection device of claim 7 wherein the positioning verification device is further configured to:
   determine when the fingers of the subject are positioned at desired imaging locations within the imaging volume; and
   trigger the at least one image capture device to automatically capture images of each of the plurality of fingerprints at each of the at least two different depths when the fingers of the subject are positioned at the desired imaging locations.

10. The contactless multi-fingerprint collection device of claim 7 wherein the positioning verification device is further configured to:
   track movement of the hand of the subject within the imaging volume; and
   based on the tracked movement of the hand, control an actuating device corresponding to each of the at least one image capture devices to control a field-of-view and focus depth of the image capture device, so as to provide for capture of in-focus images of the fingers.

11. The contactless multi-fingerprint collection device of claim 10 wherein the actuating device varies a position of a mirror, a lens element, or a camera sensor, to move the field-of-view of a respective image capture device.

12. The contactless multi-fingerprint collection device of claim 7 wherein the positioning verification device is further configured to:
   track movement of the hand of the subject within the imaging volume; and
   based on the tracked movement of the hand, digitally control each of the at least one image capture devices to control a field-of-view thereof, so as to provide for capture of in-focus images of the fingers.

13. The contactless multi-fingerprint collection device of claim 1 wherein the at least one image capture device is adaptable to a size of the hand of the subject to enable the capture of the plurality of fingerprints, with each of the at least one image capture devices having an increased field-of-view for a respective finger of the subject so as to accommodate a plurality of hand and finger sizes.

14. The contactless multi-fingerprint collection device of claim 1 wherein the at least one image capture device comprises:
   a camera to capture a reflected light from a fingerprint;
   an electro-optics arrangement positioned between the fingerprint and the camera, the electro-optics arrangement including a liquid crystal panel (LCP) and a birefringent element through which light reflected from the fingerprint passes through; and a voltage source to apply voltage to the LCP to change orientation states thereof, so as to rotate the linear polarization of the reflected light and vary an optical path length of the birefringent element to provide for capture of images at each of the at least two different depths.

15. The contactless multi-fingerprint collection device of claim 14 wherein the camera comprises a line scan camera configured to capture the images of the plurality of fingerprints at each of the at least two different depths as the hand of the subject is swiped laterally through a field-of-view of the line scan camera.

16. The contactless multi-fingerprint collection device of claim 1 wherein the at least one image capture device comprises a line scan camera tilted at an angle relative to the hand of the subject as it is swiped at a lateral trajectory through the imaging volume, such that the line scan camera captures the images of the plurality of fingerprints at each of the at least two different depths without the use of a liquid crystal panel.

17. The contactless multi-fingerprint collection device of claim 1 wherein, for each of the plurality of fingerprints, the processor is further configured to:
register the fingerprint images captured at the at least two different depths to create pixel correspondence between the resultant registered images;
combine the registered images to form the composite image of each of the plurality of fingerprints;
calculate a depth of structural features of the composite image of each of the plurality of fingerprints using one of a depth from focus and a depth from defocus algorithm; and
generate the two-dimensional rolled equivalent image of each of the plurality of fingerprints from the calculated depth of structural features and the composite image.

18. The contactless multi-fingerprint collection device of claim 17 wherein, for each of the plurality of fingerprints, the processor is further configured to:
create a 3D point cloud data set using pixel intensities from the fingerprint images captured at the at least two different depths and the one of the depth from focus and depth from defocus algorithms;
create a distortion map from the 3D point cloud; and
use the distortion map to transform a pixel space of the composite image into a new pixel space, the new pixel space representing the two-dimensional rolled equivalent image.

19. The contactless multi-fingerprint collection device of claim 18 wherein the processor is further configured to generate the distortion map using dimensions of a finger from which the fingerprint images at the at least two different depths were obtained, and wherein the dimensions are based on at least one of:
a cylindrical assumption of the finger;
a cylindrical assumption for each cross section of the finger perpendicular to a long dimension of the finger and a mathematical model curve representing a center of the finger along its long dimension;
an arbitrary curve assumption of the finger cross section perpendicular to the long dimension of the finger and a different arbitrary curve assumption representing the center of the finger along its long dimension.

20. A method for collecting images of multiple fingerprints of a subject in a contactless manner, the method comprising:
receiving within an imaging volume of a contactless multi-fingerprint collection device, a hand and fingers of a subject;
providing feedback to the subject regarding a position of the fingers within the imaging volume and relative to a field-of-view of an image capture device, to aid in guiding fingers to a desired imaging location within the imaging volume; the feedback comprising a 2-D hand image generated on a display screen that is indicative of a position of the hand of the subject within the imaging volume, the 2-D hand image comprising a color coded hand image configured to display each finger of the subject on the display screen in one of a plurality of colors based on a proximity of a respective finger to a desired imaging location;
determining when the fingers of the subject are within a field-of-view of an image capture system of the contactless multi-fingerprint collection device, within the imaging volume;
capturing fingerprint images of each of the fingers at each of at least two different depths from the fingerprints by way of the image capture system;
registering and combining the fingerprint images captured at the at least two different depths to create pixel correspondence between the images and to form a composite image of each of the plurality of fingerprints;
calculating a depth map of the composite image for each of the plurality of fingerprints using one of a depth from focus and a depth from defocus algorithm; and
generating a two-dimensional rolled equivalent image of each of the plurality of fingerprints from the composite image and the depth map.

21. The method of claim 20 wherein the fields-of-view of the image capture system comprises a plurality of oversized fields-of-view corresponding to the fingers of the subject.

22. The method of claim 20 wherein capturing fingerprint images of each of the fingers comprises capturing fingerprint images of each of the fingers at each of at least two different depths when the fingers are in a stationary position within the imaging volume.

23. The method of claim 22 further comprising providing feedback to the subject regarding a position of the fingers within the imaging volume and relative to the field-of-view of the image capture system, the feedback comprising at least one of visual feedback, audible feedback, and tactile feedback.

24. The method of claim 20 wherein capturing fingerprint images of each of the fingers comprises capturing fingerprint images of each of the fingers at each of at least two different depths as the fingers of the subject are swiped in a generally horizontal motion within the imaging volume.

25. A contactless multi-fingerprint collection device for imaging a plurality of fingerprints comprising:
an imaging volume configured to receive a hand of a subject for imaging the plurality of fingerprints;
at least one positioning verification device configured to determine a proximity of the fingers of the subject to desired imaging locations within the imaging volume;
a positioning assistance device configured to provide feedback to the subject to aid in guiding fingers to the desired imaging locations within the imaging volume;
at least one image capture device configured to capture images of each of the plurality of fingerprints at each of a plurality of focus depths from the fingerprints, the at least one image capture device being automatically triggered upon placement of the fingers at the desired imaging locations; and
a processor coupled to the at least one image capture device, the processor being programmed to:
register and combine the fingerprint images captured at the plurality of focus depths to form a composite image of each of the plurality of fingerprints;

calculate a depth map of the composite image for each of the plurality of fingerprints using one of a depth from focus and a depth from defocus algorithm; and generate a two-dimensional rolled equivalent image of each of the plurality of fingerprints from the composite image and the depth map;

wherein the positioning assistance device comprises a 2-D hand image generated on a display screen of the contactless multi-fingerprint collection device that is indicative of a position of the hand of the subject within the imaging volume, the 2-D hand image comprising a color coded hand image configured to display each finger of the subject on the display screen in one of a plurality of colors based on a proximity of a respective finger to a desired imaging location.

26. The contactless multi-fingerprint collection device of claim 25 wherein the at least one image capture device is configured to accommodate imaging of a variety of hand and finger sizes by way of one of an enlarged field-of-view of each of the at least one image capture devices or a tracking of the fingertips by a tracking device.

* * * * *